United States Patent [19]

Winter

[11] Patent Number: 4,609,200
[45] Date of Patent: Sep. 2, 1986

[54] DEVICE FOR AIDING IN THE COLLECTION, TRANSPORT AND DUMPING OF REFUSE

[76] Inventor: Anthony A. Winter, 1135 Tacoma Ave., Port Orchard, Wash. 98366

[21] Appl. No.: 793,397

[22] Filed: Oct. 31, 1985

[51] Int. Cl.⁴ .............................................. B62B 1/14
[52] U.S. Cl. .................................. 280/5.2; 280/47.27; 294/27.1; 414/456
[58] Field of Search ................... 414/454, 455, 456; D34/24, 25; 294/27.1, 30; 383/13, 16; 280/47.2, 47.24, 47.26, 5.2, 5.24, 47.27

[56] References Cited

U.S. PATENT DOCUMENTS

| | | | |
|---|---|---|---|
| 1,428,180 | 9/1922 | More | 280/47.28 |
| 2,717,706 | 9/1955 | Yow, Jr. et al. | 414/456 |
| 2,851,180 | 9/1958 | McCabe | 280/47.27 X |
| 3,247,989 | 4/1966 | Uribe | 414/456 |
| 3,275,175 | 9/1966 | Arnold | 414/456 |
| 3,830,514 | 8/1974 | Green | 280/5.24 X |

Primary Examiner—John J. Love
Assistant Examiner—Michael Mar
Attorney, Agent, or Firm—Christopher Duffy

[57] ABSTRACT

The device takes the form of a strong-back which is attachable to a garbage can, generally vertically thereof, and has top and bottom handles for hoisting the can to the dumping position used by garbage truck drivers. The strong-back also has ground wheels so that the can can be converted to a hand truck. One of the handles is rotatable and positioned between the ground wheels so as to perform as a more stable intermediate wheel for going up and down stairs and the like.

14 Claims, 5 Drawing Figures

U.S. Patent   Sep. 2, 1986   Sheet 2 of 2   4,609,200
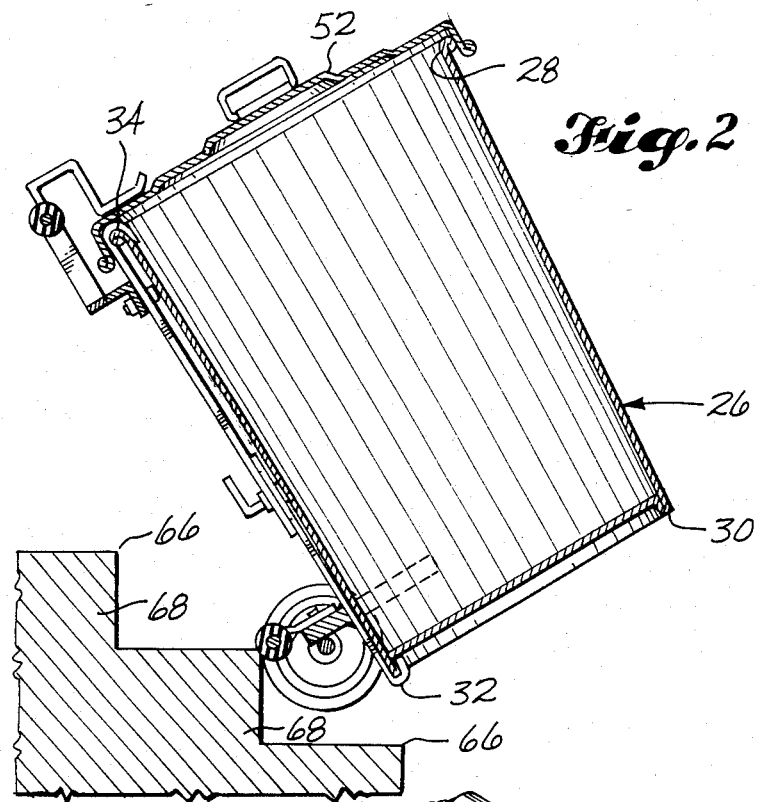
Fig. 2
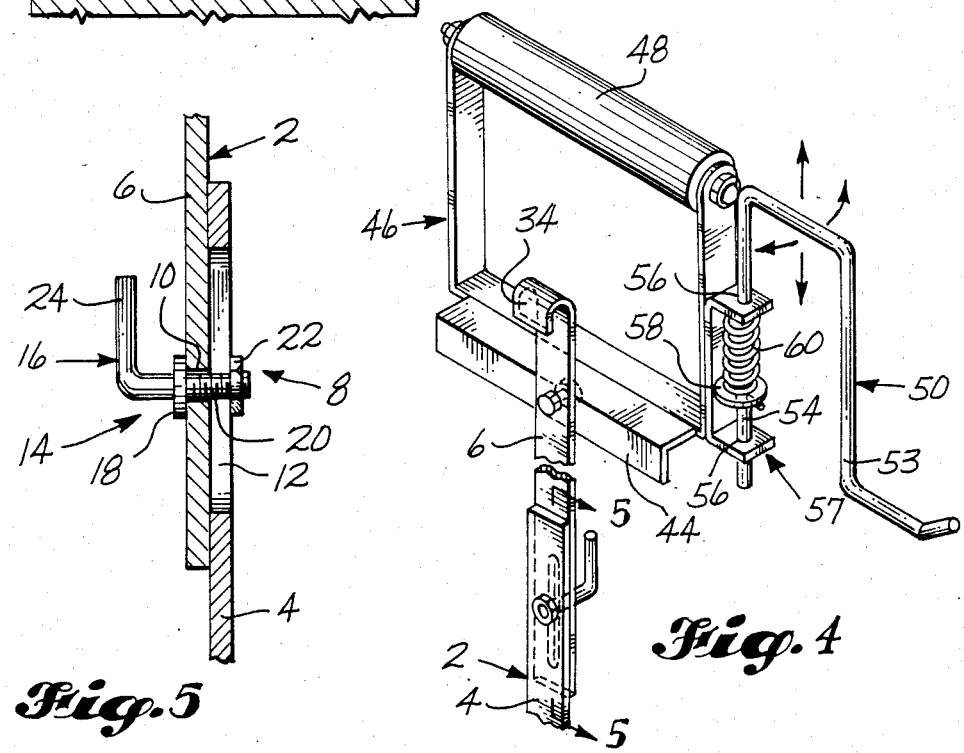
Fig. 5
Fig. 4

4,609,200

DEVICE FOR AIDING IN THE COLLECTION, TRANSPORT AND DUMPING OF REFUSE

TECHNICAL FIELD

This invention relates to the collection, transport and dumping of refuse, and particularly refuse which is collected in and from a community of home owners or the like, such as in conventional garbage cans.

BACKGROUND ART

Homeowners and the like typically collect and retain their refuse in so-called garbage cans which they then place beside the streets adjacent their homes, so that the refuse can be picked up by a private or governmental agency enpowered to remove it from the community. The agency, in turn, employs one or more men who are equipped with a large truck for collecting and removing the refuse. The men drive the truck along the streets of the community and collect the refuse from home to home. Meanwhile, to coordinate the matter, each homeowner is instructed to place his can at a location on the street, or a curbside thereof, where the driver or his helper can readily lift the can, dump it into the truck, and then return it to the site for the homeowner to recover. He is also instructed that the can itself must be adapted so that it can be hoisted by the driver or his helper to approximately chest-height, or higher, since the truckbed is commonly elevated above the site where the homeowner places the can.

The present invention relates to a device for aiding in this process, and particularly the steps of transporting the can to and from the pick-up site, and dumping the refuse in the truck from the can. The device may be employed solely by the truck driver or his helper, or it may be employed in part by the homeowner and in part by the driver or his helper. Commonly, the device is employed by both, first by the homeowner to collect and transport the refuse to the pick-up site, and then by the truck driver or his helper to raise and dump the refuse in their truck.

Hand trucks have been disclosed which were adapted to enable the homeowner to move the can from one site to another on a pair of wheels. However, in each case the hand truck required that it be detached from the can, or vice versa, before the can could be lifted for dumping into the truck. Moreover, the hand truck made no provision for its use on stairs where the wheels often rendered the can unstable in going over the edge of the steps.

DISCLOSURE OF THE INVENTION

According to the invention, means are provided for attachment to the can generally vertically abreast thereof to form an elongated strong back which has a pair of spaced handles thereon that are operatively positioned adjacent the top and bottom of the can, so that someone choosing to hoist the can for dumping, can grasp the strong back by the handles and lift the can by them to an elevation suited for dumping the refuse onto a truck or the like. The strong back also has a pair of laterally spaced ground wheels mounted on the bottom portion thereof by which, with the strong back attached to it, the can can be converted into a hand truck that is rollable on the wheels from one site to another. Moreover, the bottom handle comprises a bracket and a roller mounted for rotation thereon, and the roller is disposed in the space between the ground wheels at a position outlying the perimeter of said wheels so that it can be employed as a broad surfaced third wheel adapted to roll over the edge of steps or the like in preference to the ground wheels themselves.

In the presently preferred embodiments of the invention, the strong back takes the form of an elongated bar-like member which is adjustable in length and equipped with means on the opposing end portions thereof by which it can be clamped to the can between the top and bottom thereof, for example, between the top and bottom rims thereof. The bar-like member has a part-cylindrical collar on the bottom portion thereof which is adapted to mate with the circumference of the can to stabilize the strong back thereon, rotationally of the can. The collar is equipped, in turn, with a pair of ground wheels by which the can is convertible to a handtruck. The roller of the bottom handle is generally horizontally disposed and the bracket of the same is mounted on the collar to extend between the pair of ground wheels to a point at which the roller can function as a broad surfaced third wheel adapted to roll over the edge of steps or the like in preference to the ground wheels themselves. The top handle comprises a bracket having a hand grip thereon, and the hand grip is generally horizontally disposed so as to be parallel to the roller on the bottom handle. Preferably, the top handle is mounted on the strong back generally vertically above the bottom handle.

In certain presently preferred embodiments of the invention, the bar-like member is in two sections which are lapped together and interconnected by a clamping mechanism, such as a pin and slot mechanism in which the pin is equipped with a crank handle and threadedly interconnected with a pair of nuts, washers or other clamping means on the opposite side of the lap joint between the pair of sections.

In many of the presently preferred embodiments of the invention, the strong back is also equipped with means for yieldably clamping the lid of the can to the body of the can when desired. For example, in some embodiments, the strong back has an arm rotatably mounted thereon, which is spring loaded to assume a relatively depressed position at which it will retain the lid on the can when swung into an operative position thereover.

In one group of embodiments, the top handle comprises a yoke which is cantilevered from the top portion of the strong back, and the lid retention means are rotatably mounted on one leg of the yoke. Moreover, in many of this group of embodiments, the roller of the bottom handle is also rotatably mounted on a yoke, but in this case, the yoke is cantilevered from the collar of the strong back to enable the roller to assume the aforementioned third wheel position between the pair of ground wheels.

BRIEF DESCRIPTION OF THE DRAWINGS

These features will be better understood by reference to the accompanying drawings which illustrate a presently preferred embodiment of the invention.

In the drawings:

FIG. 2 is a cross-sectional view of the device and the can along the line 2—2 of FIG. 1, and when the two are in use as a hand truck and the hand truck is being transported up or down a set of stairs;

FIG. 4 is a greatly enlarged perspective view of the upper portion of the device; and FIG. 5 is a cross-sectional view of the device along the line 5—5 of FIG. 4.

BEST MODE FOR CARRYING OUT THE INVENTION

Figure 1:
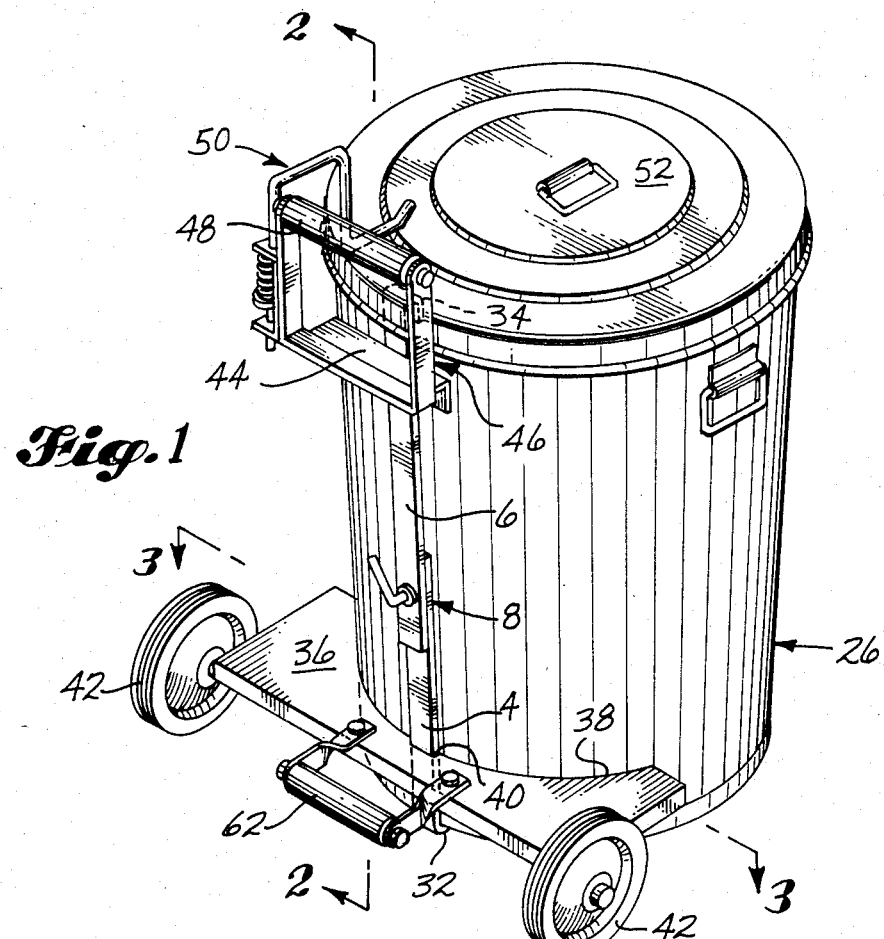
FIG. 1 is a perspective view of the device when it is fully attached to a garbage can and resting upright with the can.

Referring to the drawings, it will be seen that the device comprises an elongated but light-weight bar member 2 which is stiff and rigid but formed in two sections 4 and 6 that are clamped together at the center of the member to make a joint 8. The overlapping portions of the sections have a hole 10 and slot 12 in them, respectively, and are interconnected by a bolt-and-nut clamping mechanism 14. See FIGS. 4 and 5. The bolt 16 has a fixed collar 18 thereon, and a threaded shank 20 therebelow which is threadedly engaged with the nut 22. The bolt 16 also has a crank handle 24 at the top by which it can be turned to clamp or unclamp the sections 4 and 6. When unclamped, the sections can be shifted in relation to one another to increase the length of the member 2. The member can then be shortened, in turn, to clamp to a conventional garbage can 26. As is conventional, the can has a raised rim at the top 28 and bottom 30 thereof; and the remote ends 32 and 34 of the sections 4 and 6 are hooked to engage over the rims as in FIG. 1. Once the ends are so engaged, the sections are then clamped together again so that the member 2 becomes a strong back by which the can 26 can be hoisted to a dumping position, as shall be explained.

Welded or otherwise secured to the bottom section 4 of the member is a rectangular collar 36 which has a wide part-cylindrical cut-out 38 therein that is adapted to mate circumferentially with the body of the can 26. The cut-out 38 has a shallow groove 40 at its center, and the bottom section of the member is lodged in the groove, and as indicated, welded or otherwise secured to the collar 36. When the member 2 is clamped to the can to form a strong back, the collar 36 engages about the can and stabilizes the strong back rotationally of the can. Moreover, the collar 36 is equipped with a pair of ground wheels 42 at the opposing ends thereof so that the can can be converted to a hand truck when the strong back is attached to the same. This feature will be explained further hereinafter.

The bar member 2 also has a bracket 44 secured to the top section 6 thereof. See FIG. 4. The bracket 44 is bolted to the top section and has a yoke 46 upstanding thereon, which in turn has a roller-like handle 48 rotatably mounted between the upper ends thereof. The handle 48 is elevated above the hooked upper end 34 of the member 2, and is accompanied by a spring loaded finger 50 for retaining the lid 52 of the garbage can 26 on the top thereof. The finger 50 comprises a crooked tongue 53 which has a shank 54 at its lower end. The shank is slidably engageable in a pair of holes 56 in the opposing ends of a U-shaped mounting bracket 57 that is secured to one leg of the yoke 46. When the shank is engaged, a pin and washer stop 58 is formed in a hole in the shank 54, and a coiled spring 60 is caged about the shank between the stop 58 and the upper end of the bracket 57 to load the tongue of the finger in the downwardly direction. The finger is adapted so that when the bar member 2 is engaged on the can 26 as a strong back, the finger 50 can be raised and swiveled about the bracket 57 to assume a position above the lid 52, and then released to retain the lid on the can under the loading of the spring 60. Later, when it is desired to remove the lid from the can, the finger 50 can be swung in the reverse direction to release it from the lid. See FIG. 4.

Figure 3:
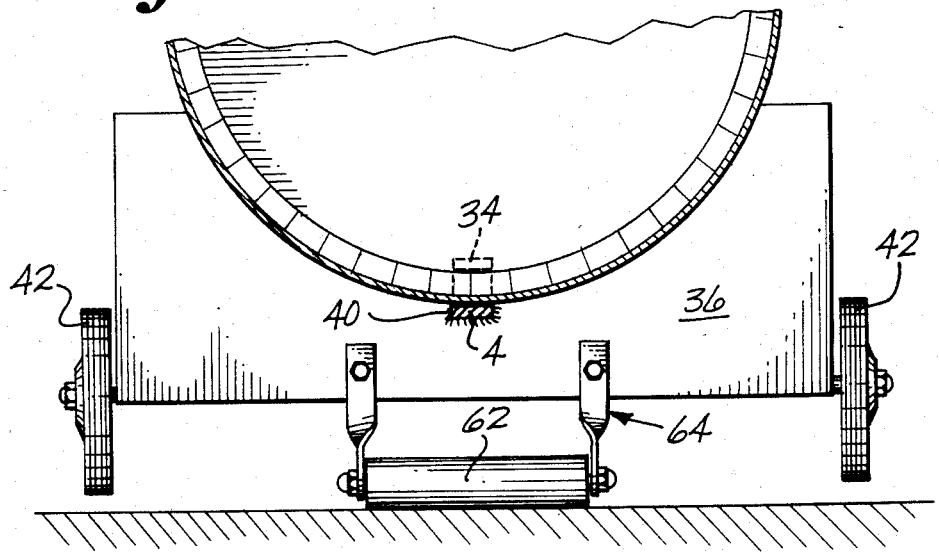
FIG. 3 is a part cross-sectional view of the device and the can along the line 3—3 in FIG. 1.

Refer now to FIGS. 1-3. It will be seen that the strong back 2 also has a second roller like handle 62 on the collar 36 thereof. The added handle is spaced apart from the top handle 48 so that a garbage truck driver or his helper can grasp the strong back and hoist the can into a position at which the refuse in the can can be easily dumped into a truck or other receptacle for the same (not shown). A second yoke 64 is cantilevered horizontally from the trailing edge of the collar, and the roller 62 thereof is rotatably mounted between the ends of the yoke. The collar and yoke are adapted so that the roller 62 is positioned between the wheels 42 of the collar at a point where it can be employed as a broad-surfaced third wheel which will roll over the edge 66 of a step 68 or the like in preference to the pair of wheels themselves, when the can and device are employed as a hand truck in the manner of FIGS. 2 and 3. The collar 36 is also sufficiently raised above the lower end of the bar member 2 that the can can rest on its bottom while the device remains attached thereto. See the relationship in FIG. 2. Thus, if desired, the device may be left attached to the can while the can is employed as a receptacle for refuse, the finger 50 being rotatable to one side each time it is desired to remove the lid for that purpose. Thereafter, when it is desired to transport the refuse to a site where it will be accessible for pick-up by the garbage truck driver, the device may be gripped by the upper handle 48 and tilted into an inclined position at which it becomes a hand truck or two-wheeler for the refuse, the finger 50 again serving to retain the lid 52 on the can while the refuse is in transport. Subsequently, at the new site, the can may be rested again on its bottom to await the driver and his pick-up operation. Then, when he arrives, the driver may release and remove the lid, and while gripping both handles 48 and 62, use the device 2, 36 as a strong back for raising the can until it assumes a dumping position. After it is unloaded, he may then return the can to an upright position for the time when the owner may choose to retransport it to his collection point.

What is claimed is:

1. A device for aiding in the collection, transport and dumping of refuse, comprising means for attachment to a garbage can generally vertically abrest thereof to form an elongated strong back thereon, said strong back having a pair of spaced handles thereon, operatively positioned adjacent the top and bottom of the can so that someone choosing to hoist the can for dumping, can grasp the strong back by the handles and lift the can by them to an elevation suited for dumping the refuse onto a truck or the like, the strong back also having a pair of laterally spaced ground wheels mounted on the bottom portion thereof by which, with the strong back attached to it, the can can be converted into a hand truck that is rollable on the wheels from one site to another, and the bottom handle comprising a bracket and a roller mounted for rotation thereon, said roller being disposed in the space between the ground wheels at a position outlying the perimeter of said wheels so that it can be employed as a broad surfaced third wheel adapted to roll over the edge of steps or the like in preference to the ground wheels themselves.

2. The device according to claim 1 wherein the strong back takes the form of an elongated bar-like member which is adjustable in length and equipped with means on the opposing end portions thereof by which it can be clamped to the can between the top and bottom thereof.

3. The device according to claim 2 wherein the bar-like member also has a part-cylindrical collar on the bottom portion thereof which is adapted to mate with the circumference of the can to stabilize the strong back thereon, rotationally of the can.

4. The device according to claim 3 wherein the collar is equipped with the pair of ground wheels.

5. The device according to claim 5 wherein the roller of the bottom handle is generally horizontally disposed and the bracket of the same is mounted on the collar to extend between the pair of ground wheels to a point at which the roller can function as a broad-surfaced third wheel adapted to roll over the edge of steps or the like in preference to the ground wheels themselves.

6. The device according to claim 5 wherein the top handle comprises a bracket having a hand grip thereon, and the hand grip of the top handle is generally horizontally disposed so as to be parallel to the roller of the bottom handle.

7. The device according to claim 6 wherein the top handle is mounted on the strong back generally vertically above the bottom handle.

8. the device according to claim 2 wherein the barlike member is in two sections which are lapped together and interconnected by a clamping mechanism.

9. The device according to claim 1 wherein the strong back is also equipped with means for yieldably clamping the lid of the can to the body of the can when desired.

10. The device according to claim 9 wherein the strong back has an arm rotatably mounted thereon, which is spring loaded to assume a relatively depressed position at which it will retain the lid on the can when swung into an operative position thereover.

11. The device according to claim 9 wherein the top handle comprises a yoke which is cantilevered from the top portion of the strong back, and the lid retention means are rotatably mounted on one leg of the yoke.

12. A device for aiding in the collection, transport and dumping of refuse, comprising:
means for attachment to a garbage can abreast thereof, to form an elongated strong back thereon,
said strong back having gripper means thereon including a handle operatively positioned adjacent the top of the can and a handle operatively positioned adjacent the bottom of the can, so that someone choosing to hoist the can for dumping can grasp the strong back by said gripper means and lift the can by said gripper means to an elevation suited for dumping the refuse onto a truck or the like,
the strong back also having a pair of laterally spaced ground wheels mounted on the bottom portion thereof by which, with the strong back attached to it, the can can be converted into a hand truck that is rollable on the wheels from one site to another, and
the bottom handle comprising a bracket and a roller mounted for rotation thereon, said roller being disposed in the space between the ground wheels at a position outlying the perimeter of said ground wheels so that it can be employed as a broad-surfaced third wheel adapted to roll over the edge of steps or the like in preference to the ground wheels themselves.

13. The device according to claim 12 wherein the strong back has a part-cylindrical collar on the bottom portion thereof which is adapted to mate with the circumference of the can to stabilize the strong back thereon, rotationally of the can, and the bracket of the bottom handle comprises a yoke cantilevered from the collar to place the roller of the bottom handle in the aforesaid third wheel position thereof.

14. The device according to claim 12 wherein the strong back takes the form of an elongated bar-like member which is adjustable in length and equipped with means on the opposing end portions thereof by which it can be clamped to the can between the top and bottom thereof.

* * * * *